March 8, 1938.   P. SALVO   2,110,342
SAFETY DEVICE FOR HYDRAULIC BRAKES
Filed July 6, 1937
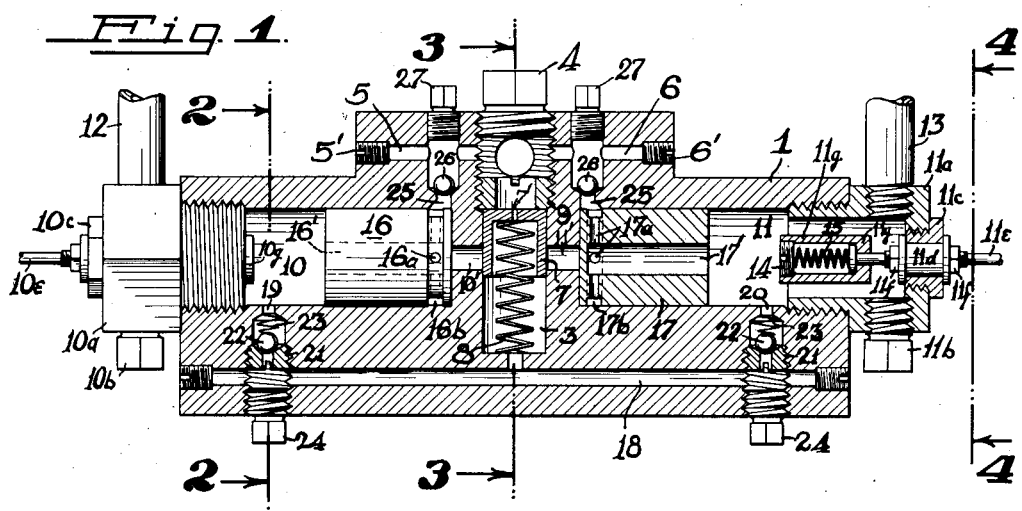
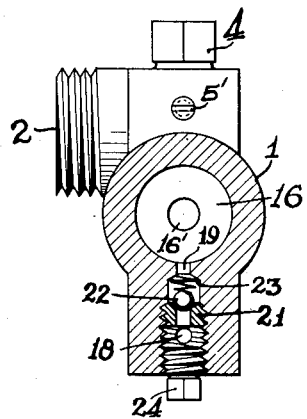
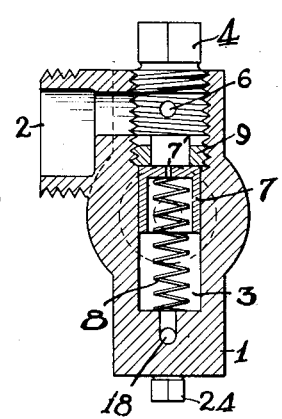
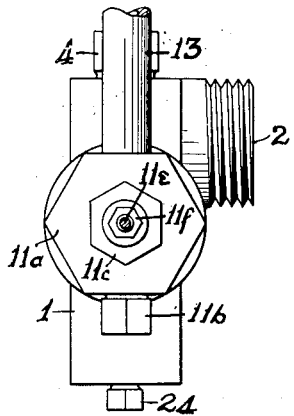
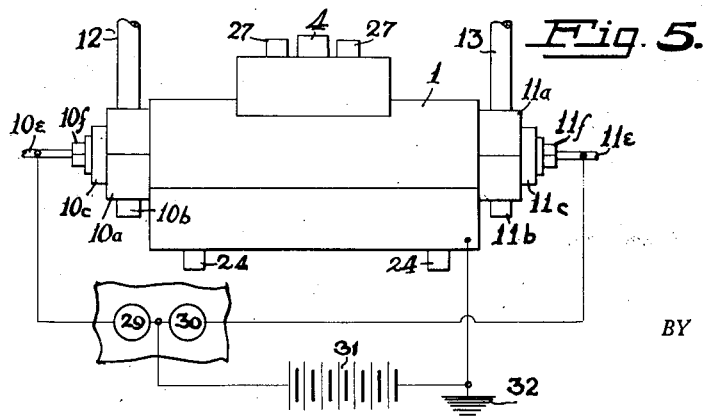
INVENTOR,
Pete Salvo
BY J.E. Trabucco
ATTORNEY Patented Mar. 8, 1938

2,110,342

UNITED STATES PATENT OFFICE 2,110,342

SAFETY DEVICE FOR HYDRAULIC BRAKES

Pete Salvo, Oakland, Calif.

Application July 6, 1937, Serial No. 152,044

7 Claims. (Cl. 303—84)

This invention relates to safety means for hydraulic brakes.

An object of my invention is to provide an improved safety device for use with the hydraulic brakes of an automobile which permits the continued operation of one or more of said brakes even though the fluid supply line to another of said brakes becomes broken or ceases to function.

Other and further objects of my invention will be pointed out hereinafter, indicated in the appended claims, or obvious to one skilled in the art upon an understanding of the present disclosure. For the purposes of this application I have elected to show herein certain forms and details of safety apparatus for use with hydraulic brakes representative of my invention; it is understood, however, that the embodiment of my invention herein shown and described is for the purpose of illustration only; and that it is not to be regarded as exhaustive of the variations of the invention, nor is it to be given an interpretation such as might have the effect of limiting the claims, short of the true and most comprehensive scope of the invention in the art.

In the accompanying drawing:

Fig. 1 is a vertical longitudinal section of my improved safety device for hydraulic brakes;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1; and,

Fig. 5 is a diagrammatic view showing the means employed for signalling the disability of one of the brakes or the fluid conduit leading thereto.

Referring to the drawing the numeral 1 designates an elongated casing which in ordinary practice is secured to a suitable oil reservoir by means of threaded inlet and outlet means 2. The casing at a point approximately mid-way between its ends is provided with a large vertical opening 3 extending from the top side of the casing to a point near its lower side. The upper end of the opening 3 is threaded and is normally closed by a removable screw plug 4. The fluid inlet and outlet means 2 of the casing connects with the upper end of the large vertical opening 3. In ordinary practice and in accordance with well known constructions, the oil is discharged under pressure from the oil reservoir into the casing 1 when the automobile brakes are applied by operating the usual foot pedal or hand lever.

Communicating with the upper end of the vertical opening 3 are two aligned longitudinally disposed openings 5 and 6 which are located in the upper side wall of the casing. The outwardly disposed ends of the openings 5 and 6 respectively, are normally closed by suitable means such as screws 5' and 6'. Mounted for vertical reciprocating movement in the opening 3 is a cylindrical floating piston 7 which is open at its bottom end and closed at its top, except for a very small opening 7' through which a limited amount of oil or other pressure fluid may proceed in a downward direction to that portion of the opening 3 located beneath the said piston, and also through which air may pass to break a vacuum in said lower portion of the said opening 3 when the piston moves in an upward direction.

The piston 7 is normally but yieldably maintained by a spiral spring 8 in an upwardly disposed position with its upper end engaging with a tubular nut 9 which is adjustably screwed in the upper threaded end of the opening 3. The vertical position of the adjustable nut 9 may be adjusted by a screwdriver or other tool so as to change the inactive normal position of the piston 7 with respect to the bottom end of the hole 3, whereby the amount of the charge of the fluid ejected by the downward movement of the piston may be varied.

The casing 1 is provided centrally with two large longitudinally disposed aligned chambers 10 and 11, having, respectively, restricted end portions 10' and 11' which communicate with the large vertical opening 3. Secured to the opposite ends of the casing 1 and communicating respectively with the outer ends of the chambers 10 and 11 are hollow plugs 10a and 11a. Screwed into the sides of the hollow plugs 10a and 11a respectively are tubular conduits 12 and 13 leading to the wheel cylinders of the front and rear brakes of an automobile or other brake mechanism if the device is used with hydraulic brakes or other type of apparatus. The hollow plugs 10a and 11a are provided with threaded openings which are normally closed by plugs 10b and 11b, the said openings being intended for use in attaching a pump or other apparatus for priming purposes as will be later described. Secured to the ends of the hollow plugs 10a and 11a respectively are tubular nuts 10c and 11c which have tubular bushings 10d and 11d secured thereto. The bushings 10d and 11d are made from insulating material such as rubber or bakelite and rods 10e and 11e pass respectively therethrough and are insulated from the hollow plugs and the casing by said bushings. That portion of each rod 10e and 11e which passes through its respective bushing is threaded, and nuts 10f and 11f thereon serve to maintain the inwardly disposed ends of said rods in predetermined positions for a purpose later to be described. The inwardly disposed ends of the rods 10e and 11e slidably extend through openings in the ends of cylinders 10g and 11g respectively, and each has an enlarged end which prevents its detachment from its associated cylinder. The inwardly disposed end of the cylinders 10g and 11g are closed by suitable screw plugs 14, and located in each of the cylinders is a spiral spring 15 which engages with the said screw plug and the enlarged end of its associated rod. The cylinders 10g and 11g are spaced from their associated hollow plugs 10a and 11a so as to prevent an electrical current from passing from either of the said cylinders to the casing 1 as will be later described.

Slidably positioned inside the large chambers 10 and 11 respectively, are pistons 16 and 17 which are adapted to move from their normal inwardly disposed adjacent positions, outwardly in opposite directions so as to force fluid from the chambers 10 and 11 into the conduits 12 and 13, and thence therethrough to the wheel brakes.

Extending longitudinally through the lower side wall of the casing is a small opening 18, the central part of which is in communication with the large vertical opening 3. The ends of the opening 18 are closed by screws or other suitable means. Extending vertically through the lower side wall of the casing 1 and positioned adjacent the ends of the latter are two openings 19 and 20 which communicate with and serve to carry fluid from the opposite ends of the small longitudinal opening 18 to the large chambers 10 and 11. The walls of the lower ends of the openings 19 and 20 are each threaded to adjustably accommodate a tubular nut 21 which provides a seat for a ball 22, the said balls being yieldably pressed downwardly by spiral springs 23 to close the openings 19 and 20. The balls 22 normally prevent fluid from passing downwardly from the chambers 10 and 11 to the small opening 18, but they allow the fluid in the opening 18 to be ejected by the downward movement of the piston 7 into the chambers 10 and 11. Screwable plugs 24 close the lower ends of the openings 19 and 20.

Extending downwardly through the upper side wall of the casing 1 in communication with the upper small longitudinal openings 5 and 6 and with the inwardly disposed ends of the longitudinal chambers 10 and 11, are vertical openings 25 which are controlled by balls 26 so as to allow fluid to pass upwardly from the two chambers 10 and 11 into the small openings 5 and 6 respectively, but to prevent the reverse movement of fluid from the said small openings to the said chambers. The upper ends of the openings 25 are threaded and closed by removable screw plugs 27. The pistons 16 and 17 are provided with axial openings 16' and 17', respectively, the inwardly disposed ends of which are closed except for radial extensions 16a and 17a leading to annular grooves 16b and 17b respectively in the peripheries of the inwardly disposed ends of the said pistons. The annular grooves 16b and 17b are so disposed with respect to the adjacent ends of their respective pistons 16 and 17 that the said grooves register with the openings 25 when the said pistons are disposed in their inwardly disposed normal positions at the adjacent ends of the chambers.

When the foot pedal or hand lever is actuated to cause the application of the braking mechanism at the wheels of the vehicle, a charge of fluid is forced through the inlet and outlet means 2 into the casing 1. The incoming charge of fluid causes the piston 7 to be pressed downwardly against the pressure of the spring 8, thereby injecting the fluid located in the lower end of the opening 3 and in 18 through the openings 19 and 20 into the chambers 10 and 11. As the piston 7 moves downwardly it passes below the points where the restricted end portions 10' and 11' of the chambers 10 and 11 join the vertical opening 3, thereby allowing the fluid then being injected into the casing under pressure to exert an outward force against the pistons 16 and 17, which are thereby actuated toward the opposite ends of the casing. The charges of fluid in the chambers 10 and 11 are thereby forced to the brake mechanisms at the vehicle's wheels, through the conduits 12 and 13. In ordinary practice the pistons 16 and 17 travel outwardly toward but not to points where they encounter the open ends of the hollow plugs 10a and 11a, but if either of the conduits 12 or 13 or their associated brake mechanism is disabled the particular piston associated with the said disabled conduit or brake will be actuated into closing engagement with its associated hollow plug. If either of the lines 12 or 13 happens to be broken, that particular line which is broken will be kept closed by its associated piston while the other line will function in its normal way to convey fluid to and from the brakes to which it is connected. In normal operation upon releasing the lever or foot pedal the outward pressure on the inwardly disposed ends of the pistons 16 and 17 is removed, and thereupon the pressure of the compressed fluid in the wheel brakes moves the said pistons back to their normal positions at the inwardly disposed ends of the chambers 10 and 11. After the pistons have been moved back to their normal positions the fluid returning into the chambers 10 and 11 from the conduits 12 and 13 passes through the openings 16', 16a and 17', 17a of the pistons 16 and 17 respectively, and into the vertical openings 25, from whence it flows through the small openings 5 and 6 into the upper end of the vertical opening 3 and thence outwardly through 2 into the reservoir.

So as to provide means for visibly indicating the brake lines which become broken or disabled I have electrically associated electrical circuits and electric light globes 29 and 30 with the operating mechanism above described. The rods 10e and 11e are electrically connected respectively to the electric light globes 29 and 30, while the latter are connected to one side of a battery 31 or other source of electrical energy. The battery 31 at its opposite end is connected to the casing 1 and to a ground 32. The inwardly disposed enlarged ends of the rods 10e and 11e are in engagement with the cylinders 10g and 11g respectively and the inwardly disposed ends of the latter are positioned so their associated pistons 16 and 17 engage therewith when they are moved outwardly toward the outwardly disposed ends of the casing. The spiral springs 15 in the cylinders 10g and 11g permit the latter to be moved outwardly when the pistons engage therewith so as not to interfere with the closing of the inwardly disposed ends of the hollow plugs 10a and 11a by the said pistons. When the pistons contact the cylinders 10g and 11g the circuits to the light globes 29 and 30 are closed, and the globes are energized and lighted. The globes remain lighted so long as the pistons engage with the cylinders 10g and 11g, but in normal practice if there is no appreciable leak in the conduits 12 or 13 the back pressure of the fluid will move the said pistons inwardly as soon as the foot pedal or hand lever is released, thereby again opening the circuits to the globes 29 and 30. If one of the conduits 12 or 13 is broken the piston associated with the said broken conduit will remain in a closed position over the open end of its associated hollow plug and also in engagement with the adjacent cylinder. The continued lighting of a light globe after releasing the brakes will indicate that the particular conduit 12 or 13 associated with the particular energized light globe is disabled.

So as to prime the device after it has been operated, when for some reason, such as a broken conduit, there is no back pressure of the fluid at one of the wheel brakes, one of the plugs 10b or 11b (depending on which line is disabled) is replaced by an attachment of a suitable pressure pump, and thereafter fluid is injected into the casing to force the outwardly disposed piston back to its normal position at the inwardly disposed end of its associated chamber 10 or 11.

The conduits 12 and 13 ordinarily have suitable extensions or branches so that fluid may be supplied to say, the front wheel brakes by the conduit 12 and to say, the rear wheel brakes by the conduit 13.

In the event either of the conduits 13 or 14 breaks there will be no pressure applied to the particular wheel brake associated with the broken conduit, otherwise the device will function in a normal manner.

This application for Letters Patent discloses subject matter similar to the apparatus shown and described in my co-pending patent application filed September 5, 1936, Serial No. 99,577, entitled "Safety device for hydraulic brakes".

Having described my invention what I claim is:

1. A safety device for hydraulic brakes comprising a casing having a fluid inlet opening extending through its side wall, the casing having a pair of oppositely disposed and aligned chambers communicating at their inwardly disposed ends with the inlet opening, the said chambers each having fluid outlet means at its outwardly disposed end connected to a braking mechanism, a piston in each chamber, the said pistons each being adapted to be actuated in an outward direction by fluid entering the casing to force charges of fluid from its associated chamber to its associated braking mechanism, and to close the outlet means of its chamber if its associated brake mechanism is disabled, and said pistons being adapted to be actuated inwardly by a back pressure of fluid entering the chambers through the outlet means from the braking mechanisms and means actuated by fluid entering the casing for priming the chambers with fluid prior to the outward movement of the pistons.

2. A safety device for hydraulic brakes comprising a casing having a fluid inlet opening and a pair of substantially aligned chambers having their inwardly disposed ends in communication with the inlet opening, the said chambers each having fluid outlet means at their outer ends, pistons in the chambers for ejecting fluid from the chambers, the said pistons each being adapted to be actuated in an outward direction by fluid entering the casing to first force charges of fluid to its associated braking mechanism and to then close its associated outlet means if its associated brake mechanism is disabled, means in the casing for conveying charges of fluid to the chambers, and means actuated by fluid entering the casing for forcing charges of fluid to the chambers.

3. In a safety device for hydraulic brakes, a casing having a chamber having fluid outlet means and fluid inlet means, a piston interposed in the chamber between the inlet means and the outlet means, the piston being adapted to be moved by fluid entering the chamber to eject a charge of fluid through the outlet means and thereafter close the said outlet means, and means in the casing and actuated by fluid entering the latter for pumping a charge of fluid into the chamber, whereby the chamber may contain fluid to be ejected by the piston.

4. A safety device for hydraulic brakes comprising a casing having a pair of chambers and fluid inlet means, fluid outlet means and fluid inlet means associated with the chambers, the said outlet means of each chamber being connected to a brake mechanism and the said inlet means being connected to the inlet of the casing, a floating reciprocating piston positioned in each chamber between its outlet means and its inlet means, the said pistons each being adapted to be actuated by fluid entering the casing through the inlet means to discharge fluid from its associated chamber to its associated brake mechanism and to thereafter close the outlet means of its associated chamber if its associated brake mechanism is disabled, and the said pistons being adapted to be actuated in reverse directions by back pressure of fluid entering the chambers through their outlet means from the brake mechanisms and channel means in the pistons and the casing for allowing fluid entering the chambers through their outlet means to proceed to the inlet means of the casing.

5. In a safety device for hydraulic brakes, a casing having a fluid inlet, a plurality of chambers in the casing, each having a fluid outlet connected to a brake mechanism, and each having a fluid inlet connected to the fluid inlet of the casing, a piston in each of the chambers adapted to be actuated by fluid entering the casing through the latter's inlet to discharge fluid from its associated chamber to its associated brake mechanism and to thereafter close the outlet of its associated chamber if its associated brake mechanism is disabled, and means actuated by fluid entering the casing for injecting a charge of fluid into the chambers.

6. In a safety device for hydraulic brakes, a casing having a fluid inlet, a plurality of chambers in the casing each having a fluid inlet connected to the fluid inlet of the casing and each having a fluid outlet connected to a brake mechanism, a piston in each chamber, the said pistons each being adapted to be actuated by fluid entering the casing to first eject fluid through the outlet means of its associated chamber to its associated brake mechanism and to then close the outlet means of its associated chamber if its associated brake mechanism is disabled, means actuated by fluid entering the casing for injecting a charge of fluid into the chambers, and means for indicating the closing of the outlet means of each chamber.

7. In a safety device for hydraulic brakes, a casing having a fluid inlet, a plurality of chambers in the casing each having a fluid inlet connected to the inlet of the casing and each having a fluid outlet connected to a brake mechanism, a piston in each chamber, the said pistons being each adapted to be actuated by fluid entering the casing to first eject fluid through the outlet means of its associated chamber to its associated brake mechanism and to then close the outlet means of its associated chamber if its associated brake mechanism is disabled, means actuated by fluid entering the casing for injecting a charge of fluid into the chambers, an electrically operated signalling device associated with each chamber, the said devices being each connected in a normally open circuit, and means for closing the circuits when the pistons are moved to a position whereby the outlet means of the chambers are closed.

PETE SALVO.